(12) United States Patent
Wallace (10) Patent No.: US 8,763,129 B2
(45) Date of Patent: Jun. 24, 2014

(54) VULNERABILITY SHIELD SYSTEM (76) Inventor: David R. Wallace, San Francisco, CA (US)

( * ) Notice: Subject to any disclaimer, the term of this patent is extended or adjusted under 35 U.S.C. 154(b) by 787 days.

(21) Appl. No.: 12/508,316

(22) Filed: Jul. 23, 2009

(65) Prior Publication Data

US 2010/0024035 A1 Jan. 28, 2010

Related U.S. Application Data

(60) Provisional application No. 61/137,039, filed on Jul. 26, 2008.

(51) Int. Cl.
*G06F 11/00* (2006.01)

(52) U.S. Cl.
USPC ............. 726/25; 726/22; 726/23; 726/24; 713/188

(58) Field of Classification Search
CPC .... G06F 21/554; G06F 21/577; G06F 21/629
USPC ............. 726/22, 23, 24, 25; 713/187, 188
See application file for complete search history.

(56) References Cited

U.S. PATENT DOCUMENTS

2009/0165132 A1* 6/2009 Jain et al. ................. 726/22
2010/0043072 A1* 2/2010 Rothwell ................. 726/24

* cited by examiner

*Primary Examiner* — Edward Zee
*Assistant Examiner* — Baotran N To
(74) *Attorney, Agent, or Firm* — Stephen J. LeBlanc; Quine Intellectual Property Law Group P.C (57) ABSTRACT

Security against computer software attacks is provided by blocking the use of known software vulnerabilities by attackers. Rather than merely discovering attacking software after it has installed itself into a computer system as in the prior art, software with a known vulnerability is monitored so that when it takes a potentially dangerous action, such as creating new attack software, that new attack software is marked and then prevented from loading. If the newly attack software cannot load, it cannot execute thus thwarting use of the newly written software to perform whatever nefarious act was intended by the attacker.

24 Claims, 5 Drawing Sheets

VULNERABILITY SHIELD SYSTEM

CROSS-REFERENCE TO RELATED APPLICATIONS

This application claims the benefit of U.S. Provisional Patent Application No. 61/137,039 filed on Jul. 26, 2008 and entitled "Vulnerability Shield System," which is incorporated herein by reference in its entirety.

BACKGROUND

1. Field of the Invention

The invention is in the field of computer system security, and more particularly to attacks using known vulnerabilities of software running on such computer systems.

2. Related Art

Software programmers write software programs to have functionality for performing a wide variety of tasks. However, such functionality can be used in ways not intended by the original software program. For example, other software programmers known as hackers sometimes use such functionality to circumvent computer system security for improper purposes. Similarly, the software programmers who write software programs also occasionally make mistakes known as bugs or flaws in the software program. Those in the security field often refer to such flaws as vulnerabilities. Some of these flaws simply prevent the software program from running or operating properly. However, as with program functionality, others allow hackers to circumvent computer system security again allowing it to be used for improper purposes.

Whether through improper use of some software program functionality or capitalizing on the existence of a programming mistake, over the years hackers have developed a large variety of attacks on the security and proper use of computer systems using these vulnerabilities. Such attacks have taken the form of computer viruses, spyware, worms, Trojan horses, root kits, etc. The objectives of these attacks have ranged from simple mischief to disabling use of a computer system to criminal actions such as accessing classified information and fraudulent online purchases.

The proliferation of modern computer systems has led to an ever increasing number of attacks on them. Many such attacks seek to capitalize on software features and/or flaws which allow the attack to perform actions not intended by the creator of the software. For example, attackers find ways to take advantage of such features and/or flaws to download software into a computing system in order to take over execution of a system process that is using the flawed software.

Prior approaches to address such attacks have generally followed two methods neither of which prevents attacks from entering a computer system. The first, used by anti-virus and anti-spyware systems, examine computer program code found in the computer system using frequently updated binary patterns of known attack software. In this case the vendors of such systems must constantly find every new attack and develop and distribute a specialized binary pattern for each attack. The second, called intrusion detection and prevention, also allow the attacks to get into a computer system and get established, but look for software behavior patterns based on which system calls are being made. Dealing with new attacks thus typically requires revision to reflect these new behavior patterns.

However, the number of different types of attacks has been large and varied with the only limitation being the creativity of the programmers who create them. In fact, such attack programmers have created hundreds of different types of attacks based on a single known software feature or flaw. This ever-increasing number and variety of such different types of attacks has been a challenge for defensive systems that therefore must constantly stay updated in order to discover and remove each new attack.

It is therefore desirable to prevent such attacks before they can enter a system and hide themselves away, without need for constant attack updates.

SUMMARY

A method for improved computer system security is shown and described herein with reference to a number of specific embodiments.

In one embodiment is a computer implemented method comprising recognizing that a first software module is being loaded into a first operating system process running on a computer, checking to see if the first software module is a known vulnerable software module and if the first software module is a known vulnerable software module then marking the first operating system process as a vulnerable process, and if the first software module is not a known vulnerable software module then checking to see if the first software module is marked do not run and if the first software module is marked do not run then blocking the first software module from loading, recognizing that a new file is being written in the computer by the first operating system process, and checking to see if the new file is an executable file and if the new file is an executable file then checking to see if the first operating system process is marked as a vulnerable process, and if the first operating system process is marked as a vulnerable process then marking the new file as a second software module marked as do not run.

In a further embodiment is a computer implemented method comprising recognizing that a first software module is being loaded into a first operating system process running on a computer, checking to see if the first software module is a known vulnerable software module and if the first software module is a known vulnerable software module then checking to see if a vulnerable function is known to exist within the known vulnerable software module and if a vulnerable function is known to exist within the known vulnerable software module then marking the first operating system as a vulnerable process if the vulnerable function is used and if a vulnerable function is not known to exist within the known vulnerable software module then marking the first operating system process as a vulnerable process, and if the first software module is not a known vulnerable software module then checking to see if the first software module is marked do not run and if the first software module is marked do not run then blocking the first software module from loading, recognizing that a new file is being written in the computer by the first operating system process, and checking to see if the new file is an executable file and if the new file is an executable file then checking to see if the first operating system process is marked as a vulnerable process, and if the first operating system process is marked as a vulnerable process then marking the new file as a second software module marked as do not run.

In a still further embodiment is a computer implemented method comprising determining that a first software module is being loaded into a first operating system process running on a computer, confirming that the first software module is a known vulnerable software module, marking the first operating system process as a vulnerable process, determining that the first operating system process is writing a second software module, confirming that the first operating system process is marked as a vulnerable process, marking the second software module as do not run, recognizing that the second software module is being loaded into the first operating system process or a second operating system process running on the computer, confirming that the second software module is marked as do not run, and blocking the second software module from loading.

DETAILED DESCRIPTION

As is known, each software application program module that runs in a computer system executes within an operating system entity called a process. Some modules may be loaded when a process starts and others are loaded dynamically, as needed, as the process runs. As is also known and explained elsewhere herein, many such software modules have a vulnerability, such as a program feature that can be utilized for nefarious purposes or a programmatic flaw that allows unintended actions or access to the computer system to occur. An attacker can capitalize on such vulnerabilities whenever a software module with such vulnerability is loaded into an operating system process.

One embodiment of the present invention monitors such loading operations to identify when a software module is being loaded into an operating system process and marks the process as being vulnerable if the software module being loaded is known to have a vulnerability. Because the software module is known to be vulnerable, the process into which it is being loaded likewise becomes vulnerable.

The vulnerable process is then monitored for certain potentially dangerous actions. For example, a vulnerable process may write a new software module. Writing a new software module is indicative of an attack, particularly when it is written by a running vulnerable process. To prevent such an attack, the newly written software module is marked as do not run. Then, when the newly written software module attempts to load into an operating system process, the do not run marking blocks it from being loaded. Because the newly written software module is blocked from loading it is prevented from running thus thwarting the attack.

In this way, a computer system and its storage can be monitored for the appearance of new executable components. Such new components can come from downloading or from modification of some pre-existing non-executable entity to make it become an executable component, both being known ways attackers defeat computer system security. Blocking the loading of such new executable components created by vulnerable processes prevents them from running and, conversely, new executable components that come from a valid installation method or from a non-vulnerable process are not affected.

Further embodiments and variations of the present invention are shown and described herein including determining process vulnerability based on use of a known vulnerable function in a known vulnerable software module, determining process vulnerability based on use of a known parameter pattern within a known vulnerable function, and remediation of use of a known parameter pattern within a known vulnerable function. Still further embodiments address updates to an application implementing the present method and distribution mechanisms for same.

Figure 1:
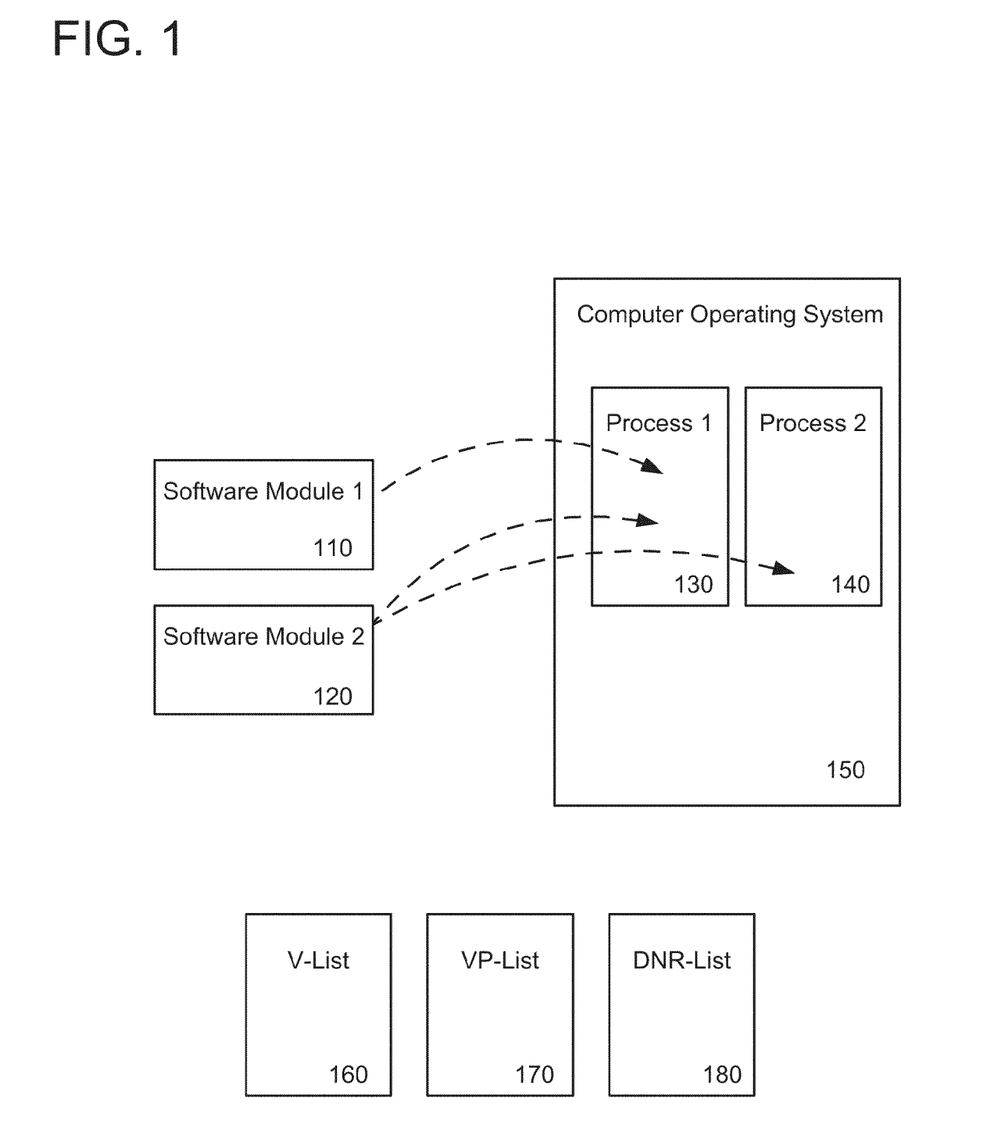
FIG. 1 is a block diagram of one embodiment of the present invention in operation.

Referring now to FIG. 1, a block diagram of one embodiment of the present invention in operation can be seen. A computer operating system 150 is shown with a first process 130 and a second process 140 each running in a computer system (not shown).

As indicated by the dashed line, first software module 110 is shown being loaded into first process 130 of computer operating system 150. First software module 110 can be determined to be a known vulnerable software module by checking it against a list of known vulnerable software modules, shown here as V-List 160. V-List 160 is created using readily available and known information as described elsewhere herein.

Loading first software module 110, because it is a known vulnerable software module, into first process 130 makes first process 130 a vulnerable process. First process 130 is therefore marked vulnerable by placing an identifier for first process 130 on a vulnerable process list, shown here as VP-List 170. Placing first process 130 on the VP-List allows monitoring for any activity within that process indicative of an attack as explained further herein.

For example, because first process 130 is marked vulnerable, if first operating system process 130 creates or renames a second software module 120, second software module 120 is marked do not run by adding an identifier for second software module 120 to a do not run list, shown here as DNR-List 180.

Then, when second software module 120 is being loaded into an operating system process, whether first process 130 or a second process 140, as indicated by the dashed lines, DNR-List 180 is checked for the identifier of second software module 120. Because second software module 120 was marked do not run by having its identifier placed on DNR-List 180, second software module 120 will be blocked from loading.

In this way, although first software module 130 has a known vulnerability, thus making it a target for attack, should an attempt be made to use the vulnerability to create a new software module or rename an existing software module, the new or renamed software module will be blocked from loading and therefore cannot execute, thus thwarting the attacker's use of the vulnerability. Further, first software module 130 is still allowed to load and operate normally despite it having a known vulnerability. In this way, software modules having known vulnerabilities are still allowed to load and execute normally yet attackers' attempts to use them improperly is prevented.

The present method uses preexisting knowledge of vulnerable software modules, and optionally as described further herein, knowledge of vulnerable functions and function parameter patterns. Knowledge of vulnerable software modules, functions and function parameter patterns is known in the art in which case the present method does not itself have to figure out what are the known vulnerable software modules, functions and function parameter values.

For example, one source of vulnerability information is the United States Computer Emergency Readiness Team (US-CERT) database (see: http(://)www(.)kp(.)cert(.)org/vuls/). The US-CERT database publishes information about a wide variety of known vulnerabilities. Review of the US-CERT database, in conjunction with review of the identified vulnerable software modules themselves, identifies vulnerable software modules, functions and parameter values as is known in the art. Another known source of vulnerability information is referred to as Common Vulnerabilities and Exposures (CVE) (see: http(://)www(.)cve(.)mitre(.)org/) which is a dictionary of publicly known information security vulnerabilities and exposures that is international in scope. Both the US-CERT and the CVE solicit submissions of newly discovered vulnerabilities in an effort to include all known vulnerabilities, or at least those that meet a certain severity threshold.

Figure 2:
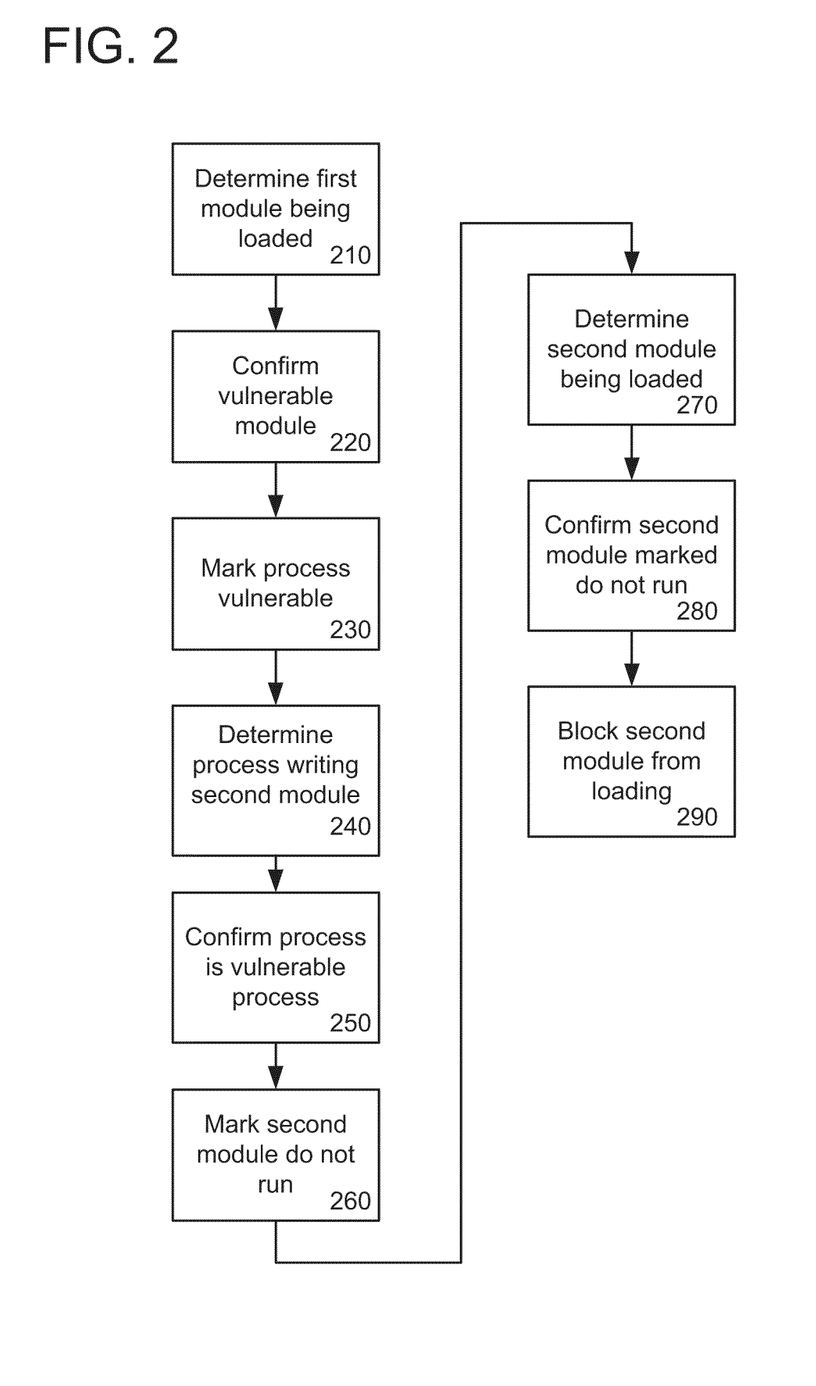
FIG. 2 is a flowchart of a general overview of the present method.

Referring now to FIG. 2, a flowchart representing an overview of the present method can be seen. In step 210, it is determined that a first software module is being loaded into a running process of an operating system, for example first software module 110 being loaded into first process 130 of FIG. 1. This can be determined using any known technique for monitoring low-level operating system load functions. For example, using function hooking as known in the art, software module load events of the Microsoft Windows operating system can be monitored via the NTCreateSection function. Similarly, a software module name can be obtained via the NtMapViewOfSection function and, as discussed elsewhere herein, monitoring file creation can be done via the NtWriteFile function.

In step 220, the first software module being loaded into a process of the operating system is then confirmed to be a known vulnerable module. This can be accomplished by obtaining the first software module name using the NtMapViewOfSection function and comparing the first software module name against a list of known vulnerable software modules, such as V-List 160 of FIG. 1.

Once the first software module is confirmed to be a known vulnerable software module then, in step 230, the operating system process into which the first software module is being loaded is marked as a vulnerable process. This can be accomplished by adding an identifier for the process to a list of vulnerable processes such as VP-List 170 of FIG. 1.

In step 240, it is determined that a process is writing a second software module. This can be accomplished using the NtWriteFile function to indicate the writing of a file (either the downloading/creation of a new file or the renaming of an existing file) and by confirming that the new or renamed file includes executable program code (thus making it a software module rather than merely a data file). An example of such new or renamed software module is software module 120 of FIG. 1.

In step 250, it is confirmed that the process writing the second software module is a vulnerable process. This can be accomplished by checking a list of vulnerable processes for the identifier of the process writing the second software module, for example VP-List 170 of FIG. 1.

In step 260, the second software module is marked do not run because it was written by a vulnerable process. This can be accomplished by adding the second software module's name to a do not run list, for example DNR-List 180 of FIG. 1.

In step 270, as before regarding the loading of the first software module, it is determined that the second software module is being loaded into a running process of an operating system, for example second software module 120 being loaded into first process 130 or second process 140 of FIG. 1.

In step 280, it is confirmed that the second software module is marked do not run. This can be accomplished by checking a do not run list, such as DNR-List 180 of FIG. 1, for the name of the second software module.

In step 290, the second software module is blocked from loading. This can be accomplished, for example, in the Microsoft Windows operating system by causing the load procedure to return a failure code of "STATUS_INVALID_IMAGE_FORMAT" which indicates a type of error that is permanent and non-recoverable.

It is to be understood that the term software module is intended to be any single executable file which may be all or only a portion of a software application. It is to be further understood that the term computer system is intended to be any computing system comprising a processing unit and an operating system and is not limited to being a complete computer system with all the elements that may typically be included. It is to be further understood that the term list is not intended to be limited to any particular data structure and can comprise any known data processing technique of keeping track of file names, processes, functions, parameters, and operational states. It is still further understood that, although not shown, each of the elements shown in FIG. 1 could exist in a single computer system where, for example, each of the shown software modules, lists, operating system and processes are stored in computer memory, whether non-volatile computer memory such as a disk drive and/or volatile working memory such as Random Access Memory (RAM) as appropriate, and that the present method could likewise be an application program operating on that computer system likewise stored in appropriate computer memory, and running on a processing unit likewise not shown in FIG. 1.

Figure 3:
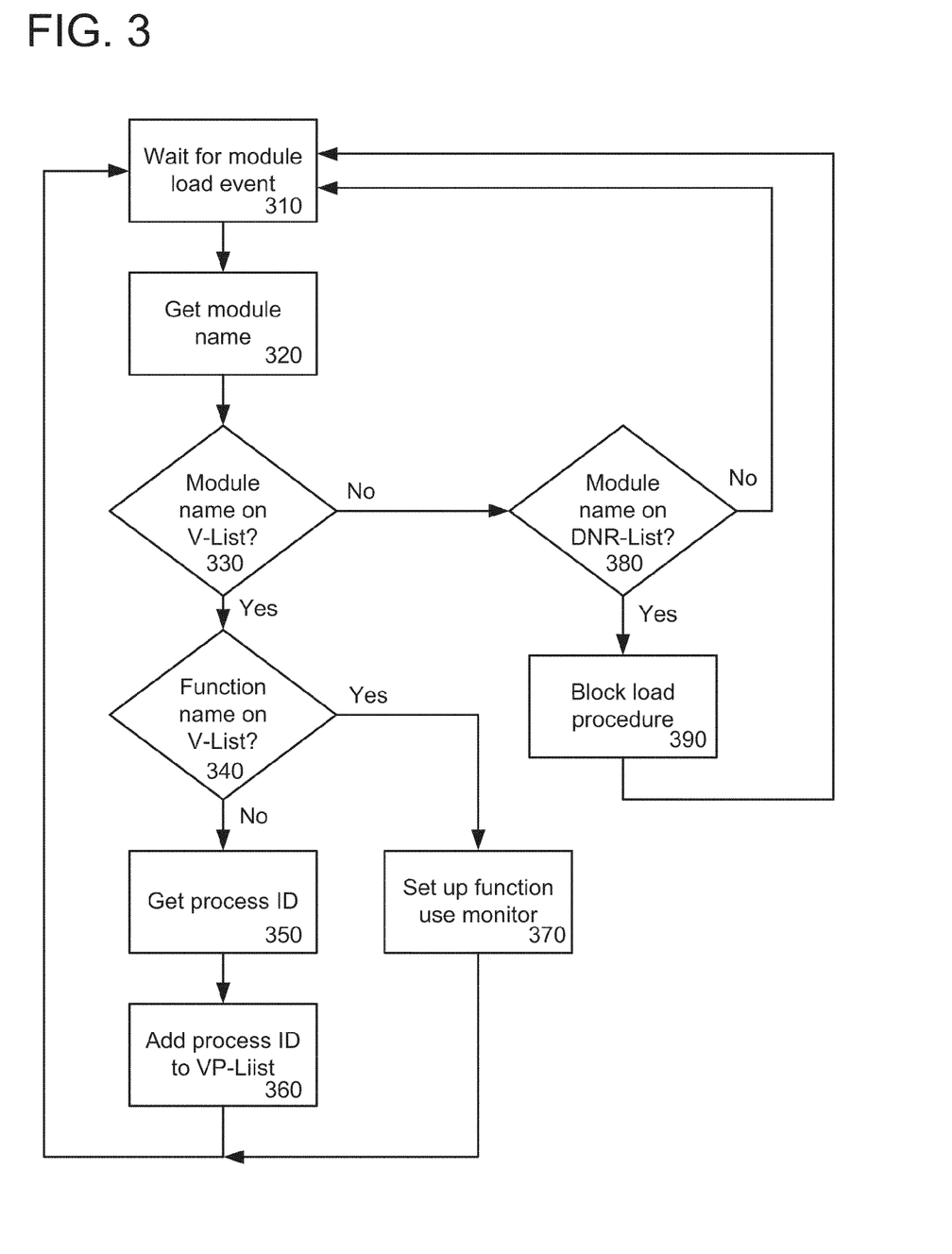
FIG. 3 is a flowchart of an embodiment of a portion of the present method.

Referring now to FIG. 3, a flowchart of an embodiment of a portion of the present method can be seen. This portion of the present method marks a process as vulnerable when appropriate and blocks the loading of a software module that is marked do not run. As such, although differing in certain respects, some steps of FIG. 3 correlate to some steps of FIG. 2 as explained below.

In step 310, a module load event occurs which indicates that a software module is being loaded into a process of any operating system. Step 310 generally correlates to step 210 of FIG. 2.

In step 320, the name of the software module being loaded is obtained as explained elsewhere herein. In decision step 330, the name of the software module is checked against a list of known vulnerable software modules such as V-List 160 of FIG. 1. Steps 320 and 330 generally correlate to step 220 of FIG. 2.

If the software module is a known vulnerable software module then, in optional decision step 340, the list of vulnerable software modules is checked to determine if the known vulnerable software contains a known vulnerable function as explained elsewhere herein.

If the known vulnerable software module does not contain a known vulnerable function, or optional decision step 340 is not implemented, then in step 350 an identifier of the operating system process into which the software module is being loaded is obtained.

In step 360 the process is marked vulnerable by adding its identifier to a list of vulnerable processes such as VP-List 170 of FIG. 1. Steps 350 and 360 generally correlate to step 230 of FIG. 2.

Alternatively, referring again to optional step 340, if the known vulnerable software module does contain a known vulnerable function and optional decision step 340 is implemented then, in step 370, a monitoring operation is set up to identify when the known vulnerable function is being used. Setting up such a monitoring operation can be accomplished using any known function use monitoring technique.

One such known function use monitoring technique modifies the Import Address Table (IAT) of the module containing the vulnerable function. As is known, the IAT is used to link in new software modules dynamically by insertion of indirect jump instructions into IAT entries. Such jumps allow function monitoring by means of function address substitution. This approach has the additional advantage of limiting overhead to only vulnerable functions since they are the only ones then being monitored. Such address substitution allows monitoring of functions within a dynamic linked library (DLL) as well as the parameters of those functions. Further, in a preferred embodiment, the present method will monitor those vulnerable module functions, whether internal or external, that show a flaw most directly. Frequently such functions are internal to a module. For example, this allows monitoring a vulnerable module function with parameter values that can directly cause a buffer overflow. Of course, this approach also covers monitoring of external functions and/or parameters that can cause buffer overflows or other illegal behavior.

Whether proceeding through step 360 or optional step 370, the present method returns to wait for another software module load event in step 310 and the software module being loaded into a process of the operating system is not affected by the steps described to this point in FIG. 3.

Referring again to decision step 330, if the software module being loaded into an operating system process is not a known vulnerable process, that is, the name of the software module is not on a list of known software modules such as V-List 160 of FIG. 1, then in decision step 380 the software module is checked to see if it is marked do not run. This may be accomplished by checking the name of the software module against a do not run list such as DNR-List 180 of FIG. 1. Step 380 generally correlates to step 280 of FIG. 2.

If the name of the software module is not on a list of do not run software modules then the present method returns to wait for another software module load event in step 310 and, again, the software module being loaded into a process of the operating system is not affected by the steps described to this point in FIG. 3.

Alternatively, if the name of the software module is on a list of do not run software modules then the software module is blocked from loading in step 390. Step 390 generally correlates to step 290 of FIG. 2.

In this way, operating system processes that load a known vulnerable software module are themselves marked vulnerable and software modules marked as do not run are blocked from being loaded into an operating system process.

Figure 4:
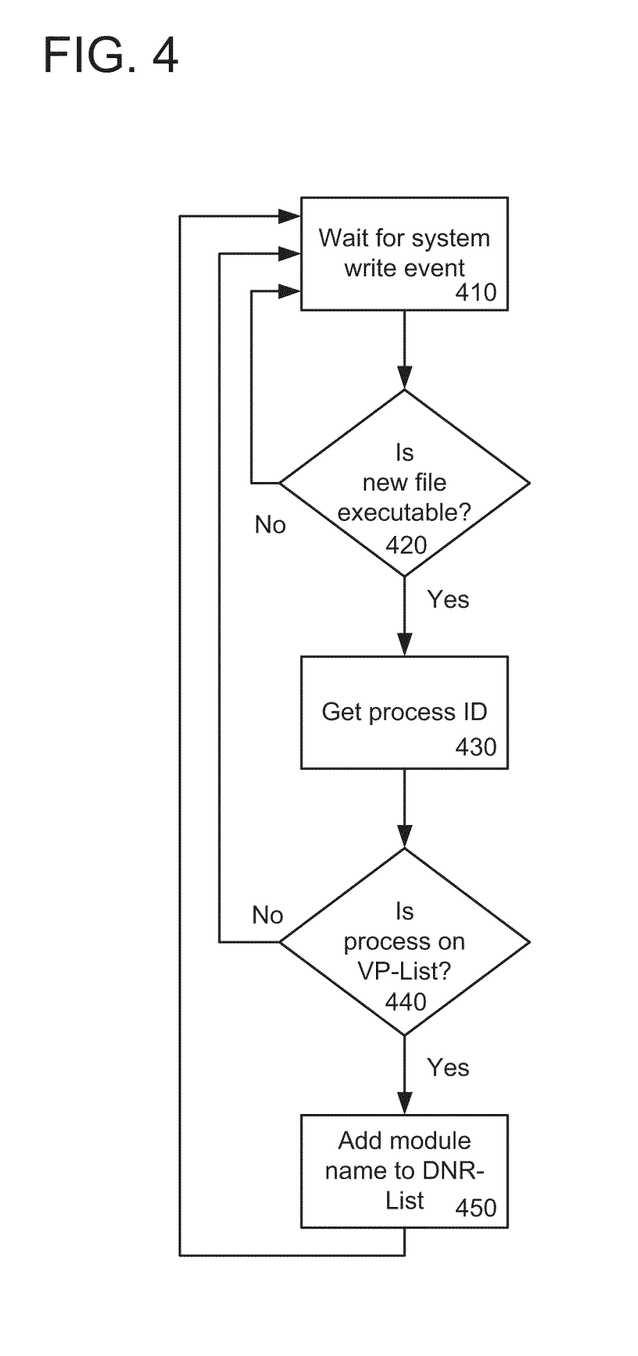
FIG. 4 is a flowchart of an embodiment of another portion of the present method.

Referring now to FIG. 4, a flowchart of an embodiment of another portion of the present method can be seen. This portion of the present method marks as do not run a software module created by a vulnerable process. As such, although differing in certain respects, some steps of FIG. 4 correlate to some steps of FIG. 2 as explained below.

In step 410, an operating system write event occurs which indicates that a software module is either downloading/creating a new file or renaming an existing file. As is known, downloading/creating a new file or renaming an existing file are typical ways used by attackers to breach the security of a computer system.

In decision step 420, it is determined whether the new or renamed file is a file containing executable program code and is therefore a software module. If the new or renamed file does not contain executable program code and is therefore not a software module then the present method returns to step 410 to wait for another operating system write event.

Alternatively, if the new file or renamed filed does contain executable program code and is therefore a software module then the present method continues to step 430. Steps 410 and 420 generally correlate to step 240 of FIG. 2.

In step 430, an identifier for the process in which the software module causing the operating system write event to occur is obtained. In step 440, the identifier is then compared against a list of vulnerable processes, such as VP-List 170 of FIG. 1, to determine whether the process is a vulnerable process. If the process in which the software module causing the operating system write event to occur is not on the list of vulnerable processes then the present method returns to step 410 to wait for another operating system write event.

Alternatively, if the process in which the software module causing the operating system write event to occur is vulnerable, that is, the process is on the list of vulnerable processes such as VP-List 170 of FIG. 1, then the newly written software module (which is the new or renamed file) is marked do not run. This can be accomplished by adding the newly written software module name to a do not run list such as the DNR-List 180 of FIG. 1. Step 450 generally correlates to step 260 of FIG. 2.

Figure 5:
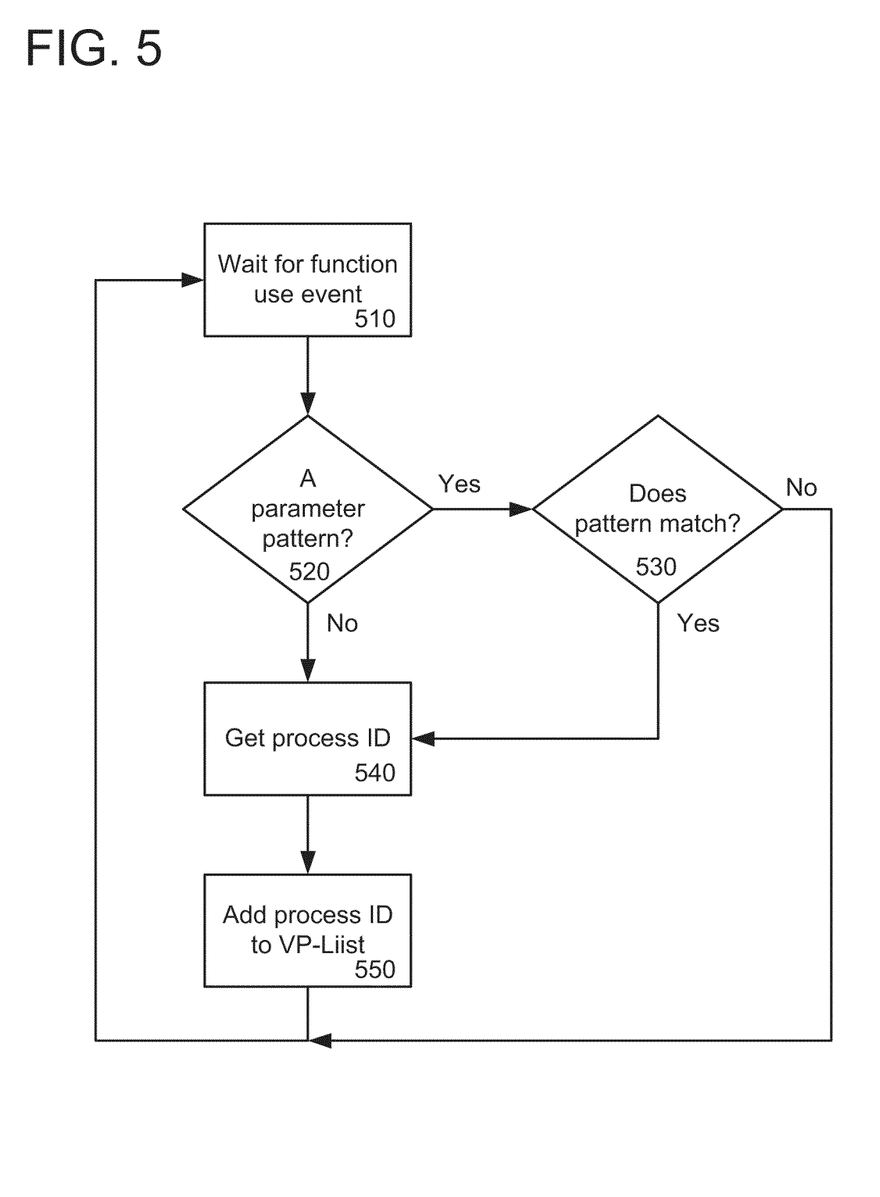
FIG. 5 is a flowchart of an embodiment of an optional portion of the present method.

Referring now to FIG. 5, a flowchart of an embodiment of an optional portion of the present method can be seen. This portion of the present method optionally handles the monitoring of vulnerable module functions and vulnerable module function parameters as appropriate. As such the steps of FIG. 5 are the outcome of optional steps 340 and 370 of FIG. 3 as explained below.

As was explained with reference to FIG. 3 with respect to optional steps 340 and 370, the present method can optionally set up a function use monitor to watch for the use of a vulnerable function. Step 510 waits for use of the vulnerable function within the vulnerable module. This can be accomplished as described above with respect to step 370 of FIG. 3.

Once an event indicating use of the vulnerable function occurs then the method proceeds to optional decision step 520 which checks to see of the function being used includes a parameter pattern. If not, then in step 540 an identifier of the operating system process in which the vulnerable module containing the vulnerable function is obtained and, in step 550, the process is marked as vulnerable. This can be accomplished by adding the operating system process identifier to a list of vulnerable processes such as VP-List 170 of FIG. 1. The present method would then return to step 510 to wait for another function use event.

Alternatively, if the outcome of optional decision step 520 is that the function being used does include a parameter pattern then, in optional decision step 530, it is determined whether the value of the function parameter pattern being used matches a known dangerous parameter pattern such as those precipitating a buffer overflow.

Any known pattern matching technique can be used including pattern matching of a type similar to regular expressions but augmented with length predicates for matched strings or substrings. Further, when a vulnerability involves function parameters that are specific values, forms or characteristics, then active parameter value remediation can optionally be performed as explained elsewhere herein.

If the value of the function parameter pattern being used does match a known dangerous parameter pattern (e.g., an illegal pattern or a parameter that is too big), then the present method proceeds to steps 540 and 550 which results in marking the process as vulnerable, as described above.

Alternatively, if the outcome of optional decision step 530 is that the value of the function parameter pattern being used does not match a known dangerous parameter pattern, which means that exploitation of the vulnerability of the function is apparently not being attempted. In this case the present method returns to step 510 to wait for another function use event without going through steps 540 and 550 which would have resulted in marking the process as vulnerable, as described above.

It is to be understood that optional steps 520 and 530 are optional because the present method could simply watch for use of a vulnerable function and, based simply on that use, cause the process in which the module function is running to be marked as vulnerable. Optional steps 520 and 530 therefore provide a finer level of granularity regarding use of a known vulnerable function.

Similarly, referring again to FIG. 3, optional steps 340 and 370 are optional because the present method could simply watch for loading of a known vulnerable module and, based simply on that, cause the process in which the known vulnerable module is being loaded to be marked as vulnerable. Optional steps 340 and 370 therefore provide a finer level of granularity regarding use of a known vulnerable function and, further optionally, use of a function parameter value that matches a known dangerous pattern.

Referring again to FIG. 5, in a further optional embodiment, rather than simply mark a process as vulnerable because of use of a function parameter value that matches a known dangerous pattern, the present method can be extended to modify the actual function parameter value so that it no longer matches the known dangerous pattern or is truncated so it is no longer too big. This would thus remediate the security concern by returning the function parameter value to a known safe value thus preventing use of the vulnerable function to breach computer system security and introduce alien software.

The present method has been described primarily in the context of operating within a single computer system. As such, the present method can be considered a standalone security application program or agent which could be embodied on any known computer readable storage medium for sale and distribution. In a further embodiment (not shown), this security application agent could be provided by a central server to one or more customers or clients. This client-server distribution method could be extended further so that the central server first provides the security agent to a customer or client server which then distributes the agent to individual customer or client computer systems using known client-server distribution techniques.

Distributing the agent from a central server also provides the benefit of more rapidly providing updated agents with newly discovered vulnerabilities. For example, as the public sources described elsewhere herein identify newly discovered vulnerabilities, the agent at the central server can be updated to watch for those new vulnerabilities. The updated agent with the new vulnerability information can then be distributed from the central server to the client machines as described. Alternatively, rather than distributing the updated agent itself, an updated list (or updates to the list) of known vulnerable module names, function names and function parameter patterns could simply be distributed from the central server to the client machines. The same is true regarding removing vulnerabilities which no longer exist due to updates to the vulnerable software modules themselves. The result of these various approaches is that the present method is more easily kept current than when relying on users to purchase and/or update existing software on their own.

The present method thus blocks attacks associated with known vulnerabilities and does so without blocking known vulnerable software modules or affecting their normal operation. Further, this is accomplished without resorting to patching or modifying known vulnerable software modules.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. A computer implemented method comprising:
   recognizing that a first software module is being loaded into a first operating system process running on a computer;
   checking to see if the first software module is a known vulnerable software module and if the first software module is a known vulnerable software module then marking the first operating system process as a vulnerable process, and if the first software module is not a known vulnerable software module then checking to see if the first software module is marked do not run and if the first software module is marked do not run then blocking the first software module from loading;
   recognizing that a new file is being written in the computer by the first operating system process; and
   checking to see if the new file is an executable file and if the new file is an executable file then checking to see if the first operating system process is marked as a vulnerable process, and if the first operating system process is marked as a vulnerable process then marking the new file as do not run.

2. The computer implemented method of claim 1 further comprising:
   recognizing that the second software module is being loaded into the first operating system process or a second operating system process running on the computer; and
   checking to see if the second software module is a known vulnerable software module and if the second software module is a known vulnerable software module then marking as a vulnerable process whichever of the first operating system process or the second operating process the second software module is being loaded into, and if the second software module is not a known vulnerable software module then checking to see if the second software module is marked do not run and if the second software module is marked do not run then blocking the second software module from loading.

3. The computer implemented method of claim 1 wherein recognizing that a first software module is being loaded into a first operating system process running on a computer is accomplished by monitoring the operating system for a module load event.

4. The computer implemented method of claim 1 wherein checking to see if the first software module is a known vulnerable software module is accomplished by checking to see if a name of the first software module matches a name on a list of known vulnerable software modules.

5. The computer implemented method of claim 1 wherein marking the first operating system process a vulnerable process is accomplished by adding an identifier of the first operating system process to a list of vulnerable processes.

6. The computer implemented method of claim 1 wherein checking to see if the first software module is marked do not run is accomplished by checking to see if a name of the first software module matches a name on a list of do not run modules.

7. The computer implemented method of claim 1 wherein blocking the first software module from loading is accomplished by causing a module load process of the operating system to return a failure code.

8. The computer implemented method of claim 1 wherein recognizing that a new file is being written in the computer by the first operating system process is accomplished by detecting that the operating system is performing a file write or file name change.

9. The computer implemented method of claim 1 wherein checking to see if the first operating system process is marked as a vulnerable process is accomplished by checking to see if an identifier of the first operating system process matches an identifier on a list of vulnerable processes.

10. The computer implemented method of claim 1 wherein marking the new file as a second software module marked do not run is accomplished by adding a name of the second software module to a list of do not run modules.

11. A computer implemented method comprising:
recognizing that a first software module is being loaded into a first operating system process running on a computer;
checking to see if the first software module is a known vulnerable software module and if the first software module is a known vulnerable software module then checking to see if a vulnerable function is known to exist within the known vulnerable software module and if a vulnerable function is known to exist within the known vulnerable software module then marking the first operating system process as a vulnerable process if the vulnerable function is used and if a vulnerable function is not known to exist within the known vulnerable software module then marking the first operating system process as a vulnerable process, and if the first software module is not a known vulnerable software module then checking to see if the first software module is marked do not run and if the first software module is marked do not run then blocking the first software module from loading;
recognizing that a new file is being written in the computer by the first operating system process; and
checking to see if the new file is an executable file and if the new file is an executable file then checking to see if the first operating system process is marked as a vulnerable process, and if the first operating system process is marked as a vulnerable process then marking the new file as do not run.

12. A computer implemented method comprising:
determining that a first software module is being loaded into a first operating system process running on a computer;
confirming that the first software module is a known vulnerable software module;
marking the first operating system process as a vulnerable process;
determining that the first operating system process is writing a second software module;
confirming that the first operating system process is marked as a vulnerable process;
marking the second software module as do not run;
recognizing that the second software module is being loaded into the first operating system process or a second operating system process running on the computer;
confirming that the second software module is marked as do not run;
and blocking the second software module from loading.

13. The computer implemented method of claim 12 wherein determining that a first software module is being loaded into a first operating system process running on a computer is accomplished by monitoring the operating system for a module load event.

14. The computer implemented method of claim 12 wherein confirming that the first software module is a known vulnerable software module is accomplished by confirming that a name of the first software module matches a name on a list of known vulnerable software modules.

15. The computer implemented method of claim 12 wherein marking the first operating system process as a vulnerable process is accomplished by adding an identifier of the first operating system process to a list of vulnerable processes.

16. The computer implemented method of claim 12 wherein determining that the first operating system process is writing a second software module is accomplished by detecting that the operating system is performing a file write or file name change for a file that includes executable program code.

17. The computer implemented method of claim 12 wherein confirming that the first software module is running in the first operating system process marked as a vulnerable process is accomplished by confirming that an identifier of the first operating system process matches an identifier on a list of vulnerable processes.

18. The computer implemented method of claim 12 wherein marking the second software module as do not run is accomplished by adding a name of the second software module to a list of do not run modules.

19. The computer implemented method of claim 12 wherein recognizing that the second software module is being loaded into the first operating system process or a second operating system process running on the computer is accomplished by monitoring the computer operating system for a module load event.

20. The computer implemented method of claim 12 wherein confirming that the second software module is marked as do not run is accomplished by confirming that a name of the second software module matches a name on a list of do not run modules.

21. The computer implemented method of claim 12 wherein blocking the second software module from loading is accomplished by causing a module load process of the operating system to return a failure code.

22. A non-transitory computer readable medium having embodied thereon a program, the program being executable by a processor to perform a method comprising:
recognizing that a first software module is being loaded into a first operating system process running on a computer;
checking to see if the first software module is a known vulnerable software module and if the first software module is a known vulnerable software module then marking the first operating system process as a vulnerable process, and if the first software module is not a known vulnerable software module then checking to see if the first software module is marked do not run and if the first software module is marked do not run then blocking the first software module from loading;
recognizing that a new file is being written in the computer by the first operating system process; and
checking to see if the new file is an executable file and if the new file is an executable file then checking to see if the first operating system process is marked as a vulnerable process, and if the first operating system process is marked as a vulnerable process then marking the new file as a second software module marked as do not run.

23. A non-transitory computer readable medium having embodied thereon a program, the program being executable by a processor to perform a method comprising:
   determining that a first software module is being loaded into a first operating system process running on a computer;
   confirming that the first software module is a known vulnerable software module;
   marking the first operating system process as a vulnerable process;
   determining that the first operating system process is writing a second software module;
   confirming that the first operating system process is marked as a vulnerable process;
   marking the second software module as do not run;
   recognizing that the second software module is being loaded into the first operating system process or a second operating system process running on the computer;
   confirming that the second software module is marked as do not run;
   and blocking the second software module from loading.

24. A computer implemented method comprising:
   recognizing that a first software module is being loaded into a first operating system process running on a computer;
   checking to see if the first software module is a known vulnerable software module and if the first software module is a known vulnerable software module then checking to see if a vulnerable function is known to exist within the known vulnerable software module and checking to see if a vulnerable parameter for the vulnerable function has a known parameter pattern and if the vulnerable function is used and its vulnerable parameter value matches the known parameter pattern then marking the first operating system process as a vulnerable process, and if a vulnerable function pattern is not known to exist within the known vulnerable software module then marking the first operating system process as a vulnerable process, and if the first software module is not a known vulnerable software module then checking to see if the first software module is marked do not run and if the first software module is marked do not run then blocking the first software module from loading;
   recognizing that a new file is being written in the computer by the first operating system process; and
   checking to see if the new file is an executable file and if the new file is an executable file then checking to see if the first operating system process is marked as a vulnerable process, and if the first operating system process is marked as a vulnerable process then marking the new file as a second software module marked as do not run.

* * * * *